United States Patent [19]

Ratcliffe

[11] Patent Number: 4,529,981

[45] Date of Patent: Jul. 16, 1985

[54] NAVIGATION SYSTEMS

[76] Inventor: Stanley Ratcliffe, 2 Mason Close, Malvern Worcs., United Kingdom, WR14 2NF

[21] Appl. No.: 464,430

[22] Filed: Feb. 7, 1983

[30] Foreign Application Priority Data

Feb. 5, 1982 [GB] United Kingdom ............... 8203408

[51] Int. Cl.³ .............................................. G08G 3/00
[52] U.S. Cl. .................................... 340/985; 340/51; 340/950
[58] Field of Search ..................... 340/29, 26, 51, 950, 340/953, 954, 958, 984, 985; 364/449, 443, 424

[56] References Cited

U.S. PATENT DOCUMENTS 3,750,099 7/1973 Proctor ................................ 340/29
3,885,876 5/1975 Konopka .............................. 340/29
4,158,885 6/1979 Neuberger ........................... 340/26

FOREIGN PATENT DOCUMENTS 1384647 2/1975 United Kingdom ................. 340/29
1595582 8/1981 United Kingdom ................. 340/29

Primary Examiner—James J. Groody
Attorney, Agent, or Firm—Andrus, Sceales, Starke & Sawall

[57] ABSTRACT

A navigation system provides a shore-based continuous visual signal to a ship navigating a channel or approaching a jetty. This indicates to the ship the optimum velocity program that it should be following, which is normally a gradual reduction of speed as the ship approaches its destination. The signal is a moiré fringe display (33, 34, 35) from a rotating projector (21) which tracks the intended path under the control of a computer program. From the ship, the fringes are static if it is at the correct speed, but they move in one or other direction to indicate too fast or too slow. If the ship strays beyond an acceptable sector, the projector and program can be stepped on or back to maintain an appropriate signal visible to the ship.

3 Claims, 4 Drawing Figures

NAVIGATION SYSTEMS

This invention relates to navigation systems and is concerned with the provision of a visual signal for guidance of a vehicle. It is primarily intended for ships navigating a restricted channel, but it may have other applications, for example for airships.

A large ship such as an oil tanker has to be manoeuvred with great care when approaching a jetty. Speed must be reduced progressively over a considerable distance, and at the same time she may well be confined to a comparatively narrow channel. There will probably be a tide running, and strong winds can have an effect, particularly at low speeds. It is therefore important for the master or pilot to know not only his speed through the water, but the speed over the ground, and this is reliably obtained only from some fixed reference, preferably shore based rather than moored.

There are of course many systems for determining position. Fixed markers such as leading lights or buoys serve this purpose, and danger can be indicated by colour coding or a different flashing or occulting pattern visible to the vessel when it strays from a predetermined sector. There is also a system described in British Pat. No. 1,595,582 where a shore-based guidance device moves in accordance with the intended ship position. The system comes into operation when the ship arrives at a certain point and aims to track the ideal course and speed. If it is on a correct bearing when following this a white light is observed from the ship. If it moves ahead or lags behind then flashing coloured lights are observed. The ship aims to keep the white light in view at all times. Although it is described as a speed indicating system, in fact it only confirms whether the average speed from the starting point is correct, too high or too low. It does not indicate instantaneous speed and there is a tendency for the vessel to "hunt" back and forth to try to keep the white light in view.

The aim of the present invention is to provide an instantaneous indication of correct speed, and this might be used in conjunction with any of the known position indicating systems.

According to the present invention there is provided a navigation system wherein a moiré pattern is presented to a moving vessel in such manner that departure of the vessel from an assigned velocity program is manifested by changes in the pattern observable from the vessel.

Conveniently, the moiré pattern is presented in such manner that an unchanging pattern is displayed to a vessel maintaining its assigned program while the fringes move in one direction or the other to indicate too fast or too slow.

The presentation of the pattern in accordance with said program may be triggered by the arrival of a vessel at a predetermined position or bearing from the source. Thereafter it may be governed in accordance with the time elapsed from the commencement of the program or with the extent of movement that has occurred since that moment. Generally, the moiré pattern will be presented from a fixed location but its source will appear, at least, to rotate. The presentation of the pattern may then be governed by means sensing the bearing of the vessel from the fixed location. The apparent rate of rotation will then be a function of the actual rather than the planned bearing of the vessel. If the vessel systematically departs from the indicated velocity, its bearing will move away from the optical axis of the source. When the sensing device indicates a bearing outside the predetermined moiré fringe display sector, the display may be shifted stepwise to be directed at the vessel on its actual bearing and be moved subsequently in accordance with the assigned velocity program of a vessel moving on from that bearing. In other words, if the vessel is badly out of position at any elapsed time from the start, the system will catch up or back track to guide the vessel correctly thereafter.

This sensing may be achieved by radar or an infrared tracking device, which may be sensitive to hot exhaust gases from the vessel, for example. The sensing means may be arranged to suppress or ignore signals derived from targets outside a given range bandwidth for each bearing. If the vessel position is being continuously monitored from the shore station, then position indicating signals can be additionally displayed to the vessel, or warning signals if it strays from predetermined limits.

A single installation may not suffice for a lengthy and tortuous channel, and so there may be a plurality of such systems which come into operation in sequence, but perhaps with two (not necessarily identical) active simultaneously. Normally, each would have its own section, perhaps with a small overlap, and there may be colour or other coded signals to indicate the safe limits of use of any particular system.

The moiré pattern may be generated by two superimposed but spaced sets of backlit parallel bar gratings set slightly skew to each other, the bars being presented generally upright to the vessel so that the fringes extend generally horizontally. The spacing between the bars is preferably about two thirds of the thickness of the bars themselves. The fringes may move up for excessive speed and down for too slow a speed, or vice versa, but whatever convention is chosen it will be applied consistently. The mechanism generating the moiré pattern may either be rotated at an appropriate speed and viewed directly, or fixed in a convenient position and viewed in a mirror or through a prism which is given an appropriate motion. In either case, the axis of the projector is horizontal and the apparent rotation is about the vertical. The use of indirect projection may make it easier to protect the gratings against buffeting and consequent vibration by the wind. As further protection the installation may be protected by an independently rotatable cupola with a window for the display.

For a better understanding of the invention one embodiment will now be described, by way of example, with reference to the accompanying drawings, in which.

Figure 1:
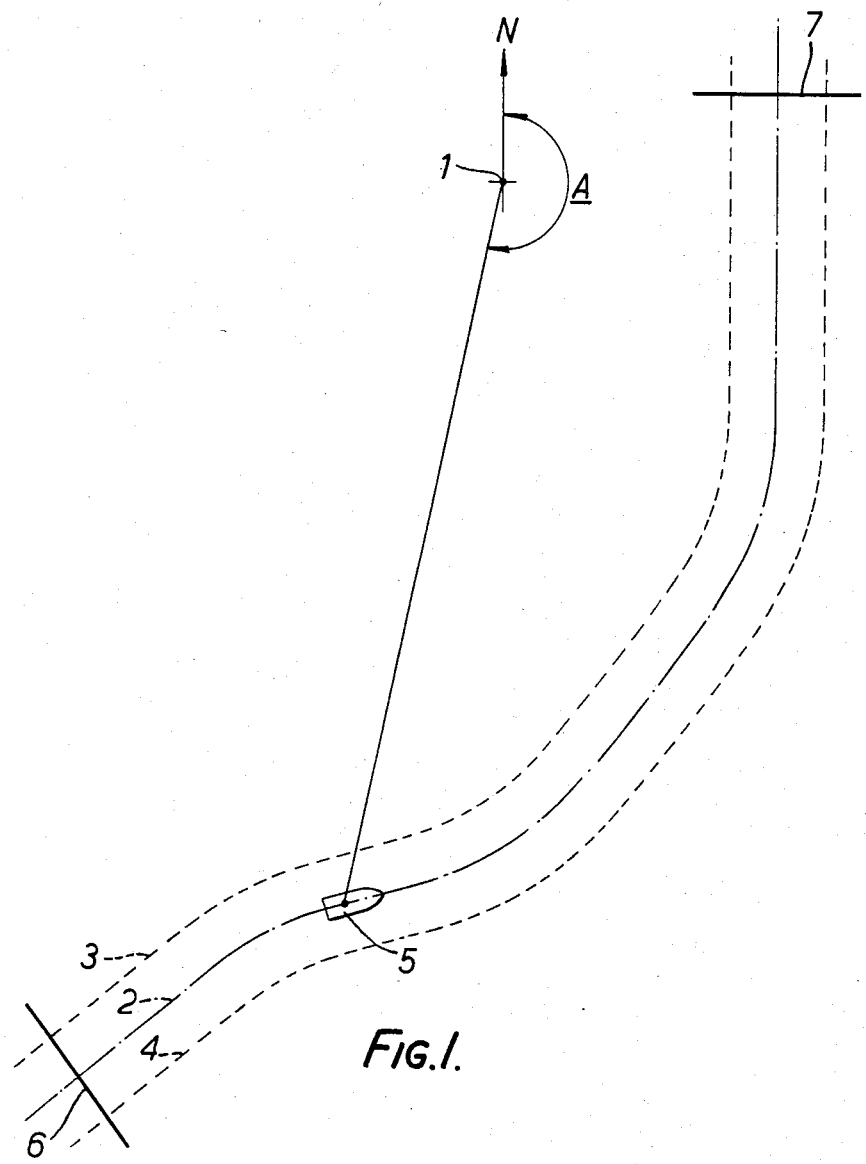
FIG. 1 is a diagrammatic chart of a channel to be followed by a ship.

Referring to FIG. 1, a visual signalling device or projector 1 is at a fixed location on shore. This commands a channel whose centre is shown as a chain-dotted line 2 and which has port and starboard limits indicated by the broken lines 3 and 4. A vessel 5 is assumed to be travelling along the centre line 2 from a start line 6 to a finish line 7, where a further system may take over. The bearing of the ship 5 from the device 1 is shown as the angle A.

It will be assumed that the line 6 marks the point at which it is appropriate for the ship 5 to begin reducing speed, or where there is a transition from another similar system. The device 1 will initially be directed at the intersection of lines 2 and 6, but as the ship crosses the line 6 the device 1 will begin to track according to an assigned velocity program. If the ship follows the correct course and that program the pilot will observe at the device 1 a static moiré fringe pattern as described below. If his speed at any instant differs from the assigned speed, then the pattern will move in a direction indicating whether the ship is moving too fast or too slow. Since the sensitivity is greatest when the ship is relatively close to the device 1, the latter is conveniently located near the slow speed end of the channel almost opposite line 7, provided geography and other factors permit.

Figure 2:
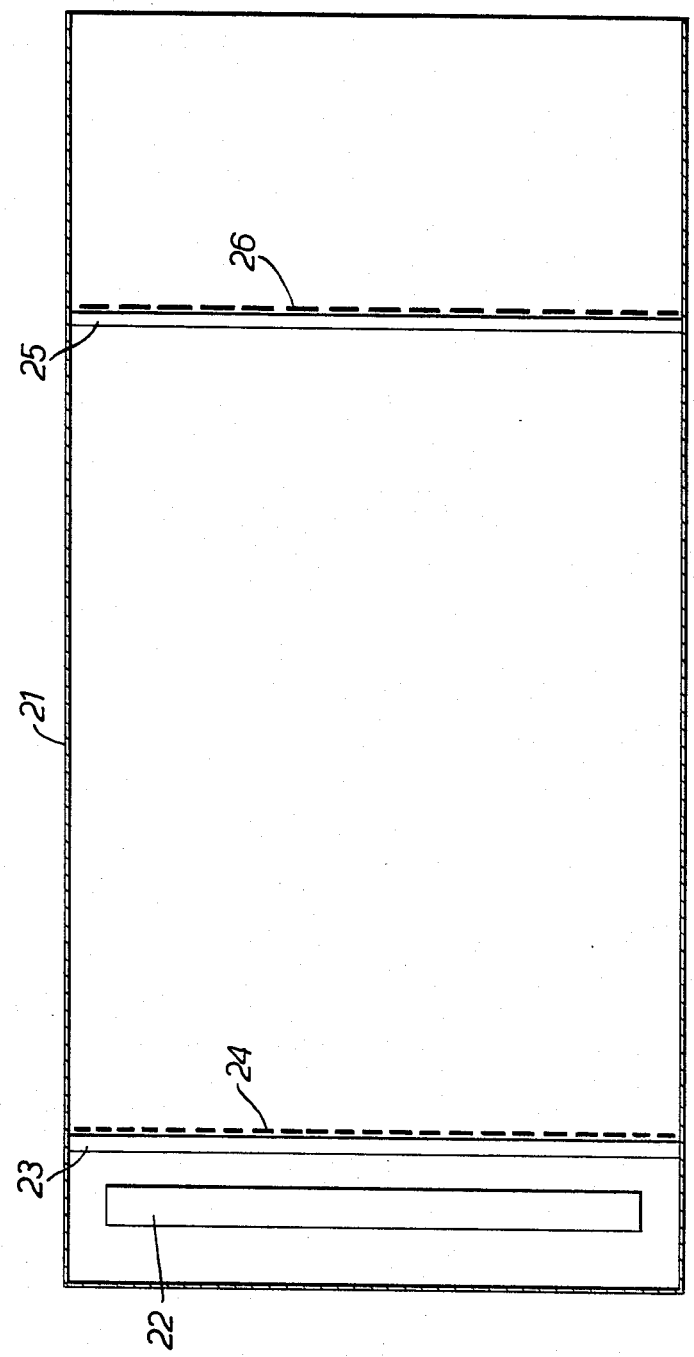
FIG. 2 is a horizontal section through a moiré fringe projector.

Referring to FIG. 2, the basic parts of the projector are housed in an open-ended box 21. At the closed end there is a light source 22 illustrated here as a horizontal tube, although there will generally be an array of lights with means such as mirrors and lenses for diffusing their illumination substantially evenly over the cross section of the box, which is about 2 m. square. A transparent plate 23 printed with a grating of parallel opaque vertical bars is arranged across the box immediately in front of the light source. The illustration of the bars 24 is diagrammatic only. About 10 m. in front of the grating 24 there is a second, parallel transparent plate 25 with another grating 26, and the box continues for about another meter to the open end to shield the grating 26 from external light. The bars of the grating 26 are of the same width and spacing as the bars 24, but they are set very slightly skew. Preferably the spacing between bars is approximately two thirds the thickness of the bars themselves, which may be of the order of 1 mm wide. The amount of skew may be such that the top ends of the bars 26 are offset 1.5 mm in relation to their bottom ends. The interior of the box is preferably painted matt black to avoid undesirable reflections.

Figure 3:
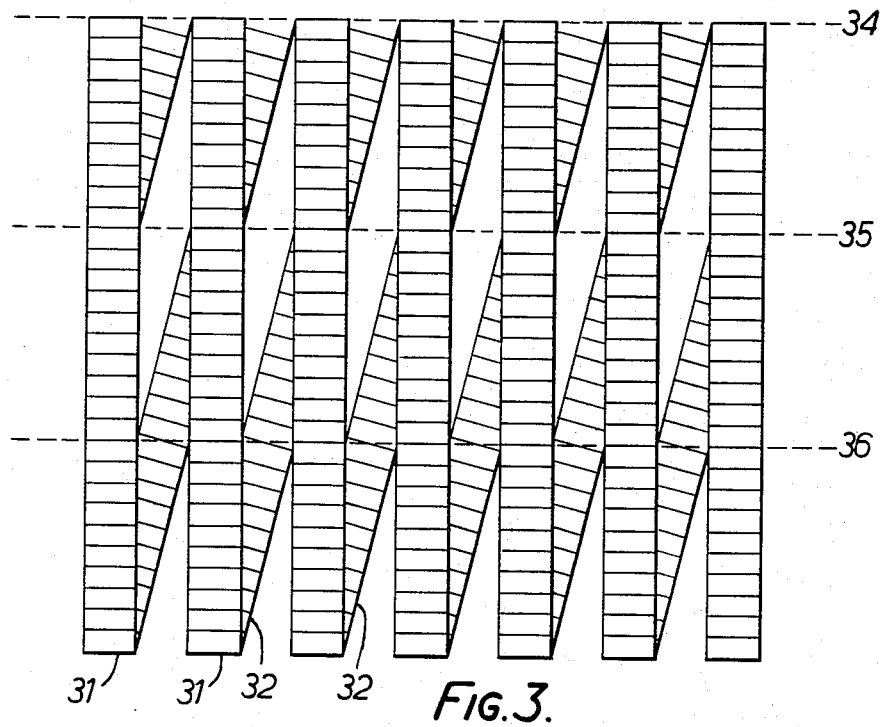
FIG. 3 is a diagram illustrating moiré fringes.

FIG. 3 illustrates moiré fringe formation from two superimposed gratings. The vertical bars are indicated at 31 and the slightly inclined bars at 32. Where the gaps between the bars of one set are completely spanned by portions of the bars of the other set, dark fringes 36 and 34 appear, while between them there is a light fringe 35. An observer moving relative to these gratings will observe the fringes moving up or down. Very little relative movement is required to observe fringe movement, and a lateral displacement subtending an angle of 0.0001 radians at the projector of FIG. 2 would be sufficient to cause the whole image to move vertically through its total height.

The projector will be rotated according to a predetermined programme so that an observer on the ship 5 will see a stationary fringe pattern when the ship is moving at the correct speed. At a distance of 0.5 nautical mile from the projector, a speed error or 0.1 knots will result in an angular rate error of 0.2 radian/hour or 0.00006 radians/sec., approximately. The moiré pattern would then move through its entire vertical height in about two seconds. This is easily apparent to the human eye.

Greater sensitivity would be possible by using gratings with narrower lines and spacings. However, mechanical problems of maintaining them in accurate alignment become more difficult.

The rotation of the projector is most conveniently controlled by a digital microprocessor which is supplied with time signals from a clock which is started as the ship crosses the line 6. It will deliver a speed demand signal to some servo mechanism which will rotate the projector. Although a pulse stepping motor is particularly well adapted to drive from digital information, it is important when rotating this projector with high angular sensitivity to avoid having a mechanism moved in steps which are visible to an observer. These would cause the moiré pattern to move disconcertingly in jerks.

Figure 4:
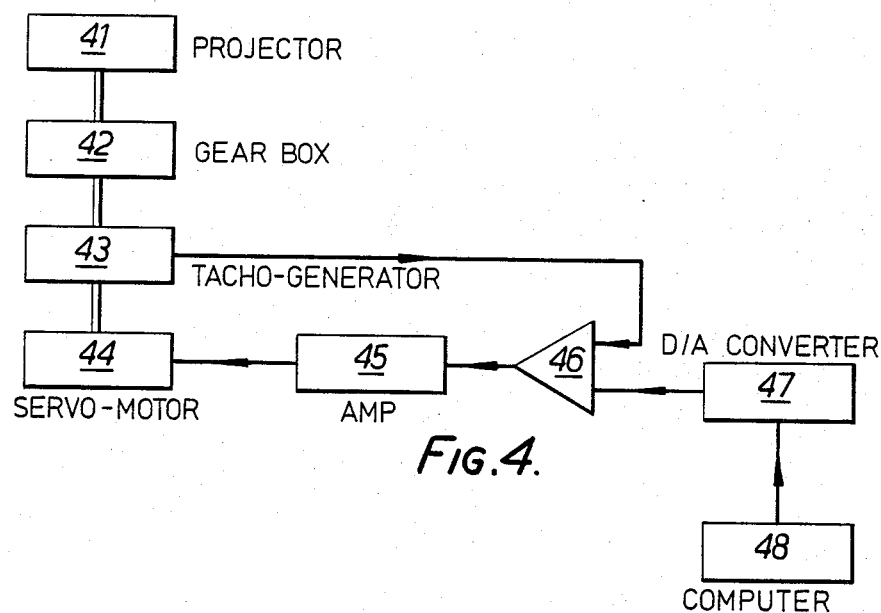
FIG. 4 is a block diagram of a projector drive system.

FIG. 4 illustrates a drive system with the projector indicated at 41 mounted on a vertical shaft and driven from a gear box 42. The drive to this is from a servo-motor 44 through a tacho-generator 43, whose output is proportional to the angular velocity of the servo-motor output shaft. The servo-motor is governed by a difference signal, fed through amplifier 45, derived from the tacho-generator output and a demand velocity in differential amplifier 46. The demand velocity is produced by a digital-to-analogue converter 47 which receives it in digital form from a clock-controlled computer 48. The latter will issue control signals at intervals of a few seconds and these will each be stored in the converter 47 until updated. This system should enable the servo-motor to run reasonably smoothly over a speed range of 50:1. To avoid problems with wind effects and irregularities in the gear box 42, the drive to the projector 41 should be spring-loaded to take up any backlash.

There will also be an arrangement for rapidly slewing the projector to either end of its traverse and particularly to the higher speed end 6. With ships entering the channel in succession it may be necessary to have this rapid return.

When a ship reaches the line 6, it may report to the shore station, or its presence may be detected by radar or an infra-red device, or it may simply be observed by the shore station. As it crosses the line 6, the projector will be pointing at it, and the computer 48 will be switched on, automatically or manually, to determine the speed programme to be followed over, say, the first five seconds. The next clock signal stimulates the computer to revise the desired angular velocity and to update its instructions to the converter 47.

A number of schemes are possible for the generation of the desired angular velocity by the computer software. One method is to record the desired velocity at equally spaced time or angle intervals and to use an interpolation technique to derive values for intermediate times or angles. In practice twenty recorded values are probably sufficient to define any likely deceleration profile in adequate detail, so that it is not difficult to store in the computer a considerable range of profile options.

The computer may have a program that is entirely time dependent. That is, as soon as the ship crosses the line 6, it ordains that the projector should rotate with an angular velocity that alters in accordance with time, irrespective of how the ship moves. Alternatively, it may be angle dependent so that for each direction of the optical axis of the projector there is a pre-ordained angular velocity. Either of these may be modified by having radar or other sensing means "observing" the ship's bearing. The velocity signalled by the projector can then be related to the actual rather than the planned bearing of the ship. If this moves too far ahead of or behind the projector axis, this can be signalled to the computer. A rapid traverse can then be generated, possibly with temporary extinguishing of the lights 22, to direct the axis towards the vessel. The program will also be jumped to cause the projector to resume its slow rotation at the angular velocity appropriate for that bearing. The fact that this step has been made may be made extra clear to the ship by a separate signal, such as a flashing light.

Instead of rotating the entire structure which generates the moirpé pattern, the gratings and light source may be rigidly mounted in a fixed position and viewed through a prism or by reflection in a mirror. The prism or mirror alone would be rotated according to the computer program.

It will be understood that not all ships need to follow the same program. There may therefore be different programs for different classes of ships, and any of these can rapidly be loaded into the computer, or otherwise selected, when the approaching ship is correctly identified.

I claim:

1. A navigation system comprising a light source, projector means in association with said light source to produce from grid means a Moiré fringe pattern visible in a horizontal sector embracing a position line, and means for moving said projector means to track said sector so that said position line intersects an intended navigational path at a point which has a predetermined speed along said path, such that said fringe pattern to an observer moving along said path within said sector has a static characteristic when said observer's speed is substantially equal to said predetermined speed, and has a dynamic characteristic when said observer's speed is different than said predetermined speed.

2. The invention according to claim 1 wherein said grid means has substantially vertical mark-space lines producing substantially horizontal Moiré fringes which move vertically in one direction when said observer's speed is greater than said predetermined speed, and move vertically in the other direction when said observer's speed is less than said predetermined speed, to provide an instantaneous indication to said observer when his speed is not substantially equal to said predetermined speed and to indicate to said observer whether his speed is greater or less than said predetermined speed.

3. The invention according to claim 2 comprising means for adjusting said projector means to direct said position line at said observer if the bearing of said observer lies outside said sector such that said projector means tracks from said bearing.

* * * * *